United States Patent
Folske et al.

(10) Patent No.: US 10,310,836 B2
(45) Date of Patent: Jun. 4, 2019

(54) ATHLETIC ACTIVITY DATA DEVICE FIRMWARE UPDATE

(71) Applicant: NIKE, Inc., Beaverton, OR (US)

(72) Inventors: Keith Folske, Wilsonville, OR (US); Jon Gale, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 73 days.

(21) Appl. No.: 15/163,907

(22) Filed: May 25, 2016

(65) Prior Publication Data

US 2016/0350100 A1 Dec. 1, 2016

Related U.S. Application Data

(60) Provisional application No. 62/167,982, filed on May 29, 2015.

(51) Int. Cl.
*G06F 8/65* (2018.01)
*G06F 8/654* (2018.01)
*G06F 9/445* (2018.01)

(52) U.S. Cl.
CPC .............. *G06F 8/65* (2013.01); *G06F 8/654* (2018.02); *G06F 8/665* (2013.01)

(58) Field of Classification Search
CPC ............ G06F 8/65; G06F 8/654; G06F 8/665
USPC .................................................. 717/168–173
See application file for complete search history.

(56) References Cited

U.S. PATENT DOCUMENTS

| | | | |
|---|---|---|---|
| 6,356,856 B1 | 3/2002 | Damen et al. | |
| 7,454,002 B1 | 11/2008 | Gardner et al. | |
| 7,805,149 B2 | 9/2010 | Werner et al. | |
| 7,927,253 B2 | 4/2011 | Vincent et al. | |
| 8,241,184 B2 | 8/2012 | DiBenedetto et al. | |
| 8,312,392 B2 | 11/2012 | Forutanpour et al. | |
| 8,784,115 B1 | 7/2014 | Chuang | |
| 8,886,118 B2 | 11/2014 | Reuss et al. | |
| 8,910,868 B1 | 12/2014 | Wade et al. | |
| 2002/0078363 A1* | 6/2002 | Hill | G06F 3/002 713/189 |
| 2003/0114256 A1 | 6/2003 | Mathog | |
| 2005/0135306 A1* | 6/2005 | McAllen | H04L 29/06 370/329 |
| 2006/0234632 A1 | 10/2006 | Lin et al. | |
| 2007/0094658 A1* | 4/2007 | DiCarlo | G06F 8/65 717/178 |
| 2007/0260421 A1 | 11/2007 | Berner et al. | |

(Continued)

FOREIGN PATENT DOCUMENTS

WO 2015021223 A1 2/2015
WO 20150025619 A1 2/2015

OTHER PUBLICATIONS

Aug. 29, 2016—(WO) ISR & WO—App. No. PCT/US16/034770.
Sep. 12, 2016—(WO) ISR & WO—App. No. PCT/US16/034746.
Wep. 6, 2016—(WO) WO & ISR—App. No. PCT/US16/034041.

*Primary Examiner* — Qing Chen
(74) *Attorney, Agent, or Firm* — Banner & Witcoff, Ltd.

(57) ABSTRACT

Systems and processes for downloading and installing a firmware update on an electronic device are provided. The firmware update may be downloaded on an electronic device while the electronic device is in a usable mode. The electronic device may be placed in an unusable mode, the firmware update may be installed while the electronic device is in the unusable mode, and the electronic device may be returned to the usable mode.

18 Claims, 8 Drawing Sheets

(56) References Cited

U.S. PATENT DOCUMENTS

| | | |
|---|---|---|
| 2008/0320587 A1 | 12/2008 | Vauclair et al. |
| 2010/0020186 A1 | 1/2010 | Matsui |
| 2010/0268806 A1 | 10/2010 | Kumar et al. |
| 2010/0325710 A1* | 12/2010 | Etchegoyen ............ G06F 21/31 726/7 |
| 2011/0275940 A1 | 11/2011 | Nims et al. |
| 2012/0274508 A1 | 11/2012 | Brown et al. |
| 2013/0104120 A1* | 4/2013 | Arrizza .................... G06F 8/65 717/173 |
| 2013/0137943 A1* | 5/2013 | Pinto Rodrigues ...... A61B 5/01 600/301 |
| 2013/0274635 A1 | 10/2013 | Coza et al. |
| 2013/0346959 A1* | 12/2013 | Tanaka ..................... G06F 8/65 717/170 |
| 2014/0023049 A1 | 1/2014 | Strecker et al. |
| 2014/0096126 A1 | 4/2014 | Gourlay et al. |
| 2014/0135042 A1 | 5/2014 | Buchheim et al. |
| 2014/0223421 A1 | 8/2014 | Carter et al. |
| 2014/0235166 A1 | 8/2014 | Molettiere et al. |
| 2014/0304700 A1* | 10/2014 | Kim .......................... G06F 8/65 717/173 |
| 2015/0081062 A1 | 3/2015 | Fyfe et al. |
| 2015/0348380 A1* | 12/2015 | Takayama ............... G08B 13/14 340/568.1 |
| 2017/0045928 A1* | 2/2017 | Ishikawa ................. G06F 1/163 |

\* cited by examiner

ATHLETIC ACTIVITY DATA DEVICE FIRMWARE UPDATE

CROSS-REFERENCE TO RELATED APPLICATION

The present application claims priority to and is a non-provisional filing of U.S. Provisional Application Ser. No. 62/167,982, filed May 29, 2015, and entitled "Athletic Activity Data Device Firmware Update," the entire contents of which are incorporated by reference herein in their entirety.

TECHNICAL FIELD

Aspects of the disclosure relate to downloading and installing a firmware update for an electronic device. More particularly, aspects of the invention relate to downloading an installing a firmware update on an athletic activity data device.

BACKGROUND

Electronic devices, such as, e.g., athletic activity data devices configured to measure one or more physical or physiological parameters during a user's workout, include firmware which control operating features of the device. This firmware may be periodically updated in response to, e.g., a bug being detected in the device's current firmware, new features being added to the device, etc. As such, the device must be placed in an unusable mode while the firmware update is downloaded and subsequently installed on the device. During the update, the device is thus unusable for a lengthy period of time (i.e., a period of time necessary to download and install the update) and a user is unable to control when the firmware update is initiated. Accordingly, a user wishing to use the device to, e.g., measure one or more parameters during a workout, may be frustrated to discover that the device is in an unusable mode and thus must either wait until the device returns to the usable mode (which may be some time) or simply proceed without the use of the device.

BRIEF SUMMARY

Aspects of the invention relate to systems and processes for downloading an installing a firmware update on an electronic device that provide increased flexibility with respect to when the firmware update is completed and that reduce the overall unusable time required for the electronic device to download and process the update. According to some aspects, a firmware update is downloaded in discrete packets, such that the download may be started and stopped as necessary and later pieced together. According to other aspects, a firmware update download is separated from a firmware update install, such that a period of time that a device must be in an unusable mode is reduced as compared to known update processes.

DETAILED DESCRIPTION

Aspects of this disclosure involve obtaining, storing, and/or processing athletic data relating to the physical movements of an athlete. The athletic data may be actively or passively sensed and/or stored in one or more non-transitory storage mediums. Still further aspects relate to using athletic data to generate an output, such as for example, calculated athletic attributes, feedback signals to provide guidance, and/or other information. These and other aspects will be discussed in the context of the following illustrative examples of a personal training system.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope and spirit of the present disclosure. Further, headings within this disclosure should not be considered as limiting aspects of the disclosure and the example embodiments are not limited to the example headings.

I. Example Personal Training System

A. Illustrative Networks

Figure 1:
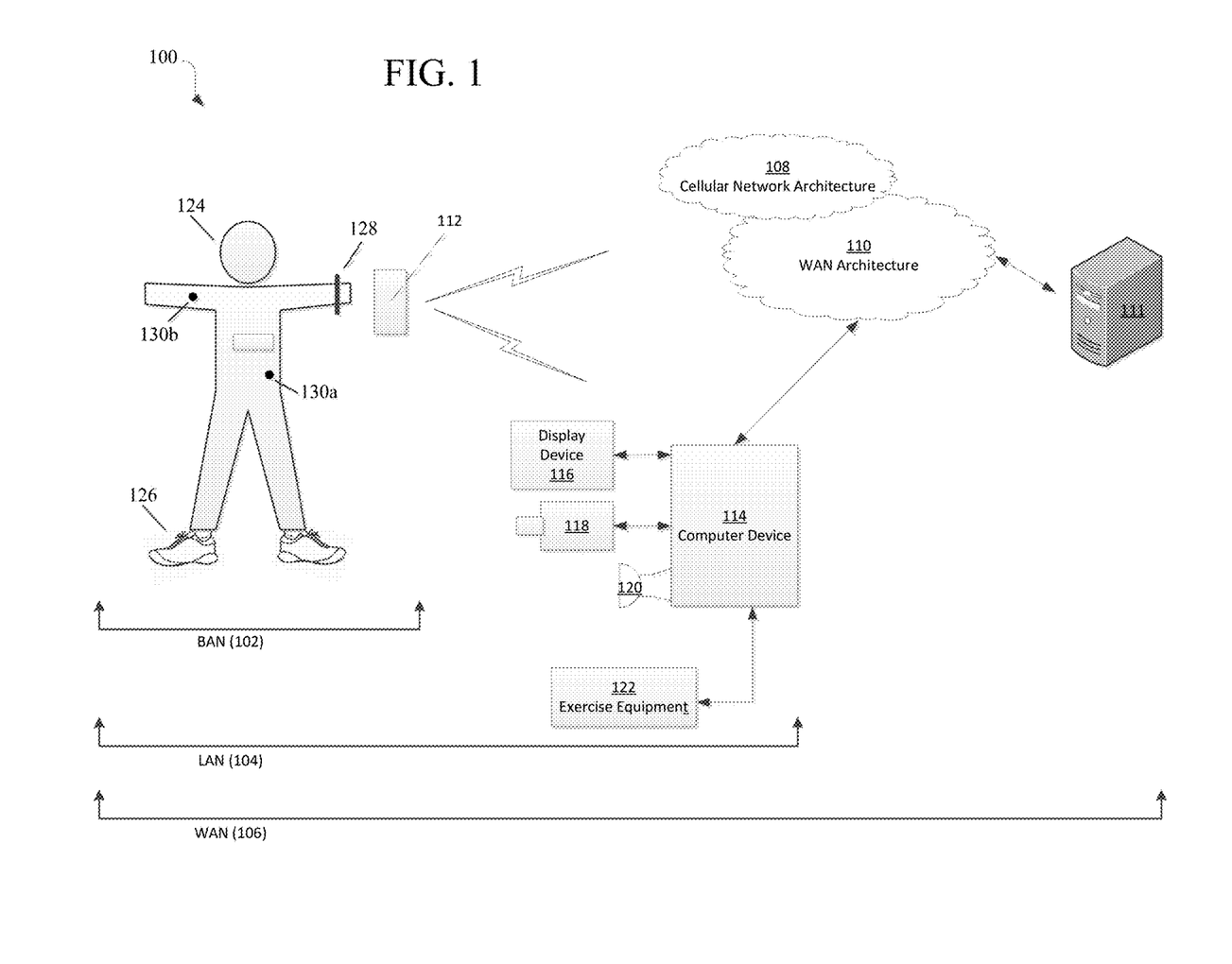
FIG. 1 illustrates an example system that may be configured to provide personal training and/or obtain data from the physical movements of a user in accordance with example embodiments.

Aspects of this disclosure relate to systems and methods that may be utilized across a plurality of networks. In this regard, certain embodiments may be configured to adapt to dynamic network environments. Further embodiments may be operable in differing discrete network environments. FIG. 1 illustrates an example of a personal training system 100 in accordance with example embodiments. Example system 100 may include one or more interconnected networks, such as the illustrative body area network (BAN) 102, local area network (LAN) 104, and wide area network (WAN) 106. As shown in FIG. 1 (and described throughout this disclosure), one or more networks (e.g., BAN 102, LAN 104, and/or WAN 106), may overlap or otherwise be inclusive of each other. Those skilled in the art will appreciate that the illustrative networks 102-106 are logical networks that may each comprise one or more different communication protocols and/or network architectures and yet may be configured to have gateways to each other or other networks. For example, each of BAN 102, LAN 104 and/or WAN 106 may be operatively connected to the same physical network architecture, such as cellular network architecture 108 and/or WAN architecture 110. For example, portable electronic device 112, which may be considered a component of both BAN 102 and LAN 104, may comprise a network adapter or network interface card (NIC) configured to translate data and control signals into and from network messages according to one or more communication protocols, such as the Transmission Control Protocol (TCP), the Internet Protocol (IP), and the User Datagram Protocol (UDP) through one or more of architectures 108 and/or 110. These protocols are well known in the art, and thus will not be discussed here in more detail.

Network architectures 108 and 110 may include one or more information distribution network(s), of any type(s) or topology(s), alone or in combination(s), such as for example, cable, fiber, satellite, telephone, cellular, wireless, etc. and as such, may be variously configured such as having one or more wired or wireless communication channels (including but not limited to: WiFi®, Bluetooth®, Near-Field Communication (NFC) and/or ANT technologies). Thus, any device within a network of FIG. 1, (such as portable electronic device 112 or any other device described herein) may be considered inclusive to one or more of the different logical networks 102-106. With the foregoing in mind, example components of an illustrative BAN and LAN (which may be coupled to WAN 106) will be described.

1. Example Local Area Network

LAN 104 may include one or more electronic devices, such as for example, computer device 114. Computer device 114, or any other component of system 100, may comprise a mobile terminal, such as a telephone, music player, tablet, netbook or any portable device. In other embodiments, computer device 114 may comprise a media player or recorder, desktop computer, server(s), a gaming console, such as for example, a Microsoft® XBOX, Sony® Playstation, and/or a Nintendo® Wii gaming consoles. Those skilled in the art will appreciate that these are merely example devices for descriptive purposes and this disclosure is not limited to any console or computing device.

Those skilled in the art will appreciate that the design and structure of computer device 114 may vary depending on several factors, such as its intended purpose. One example implementation of computer device 114 is provided in FIG. 2, which illustrates a block diagram of computing device 200. Those skilled in the art will appreciate that the disclosure of FIG. 2 may be applicable to any device disclosed herein. Device 200 may include one or more processors, such as processor 202-1 and 202-2 (generally referred to herein as "processors 202" or "processor 202"). Processors 202 may communicate with each other or other components via an interconnection network or bus 204. Processor 202 may include one or more processing cores, such as cores 206-1 and 206-2 (referred to herein as "cores 206" or more generally as "core 206"), which may be implemented on a single integrated circuit (IC) chip.

Figure 2:
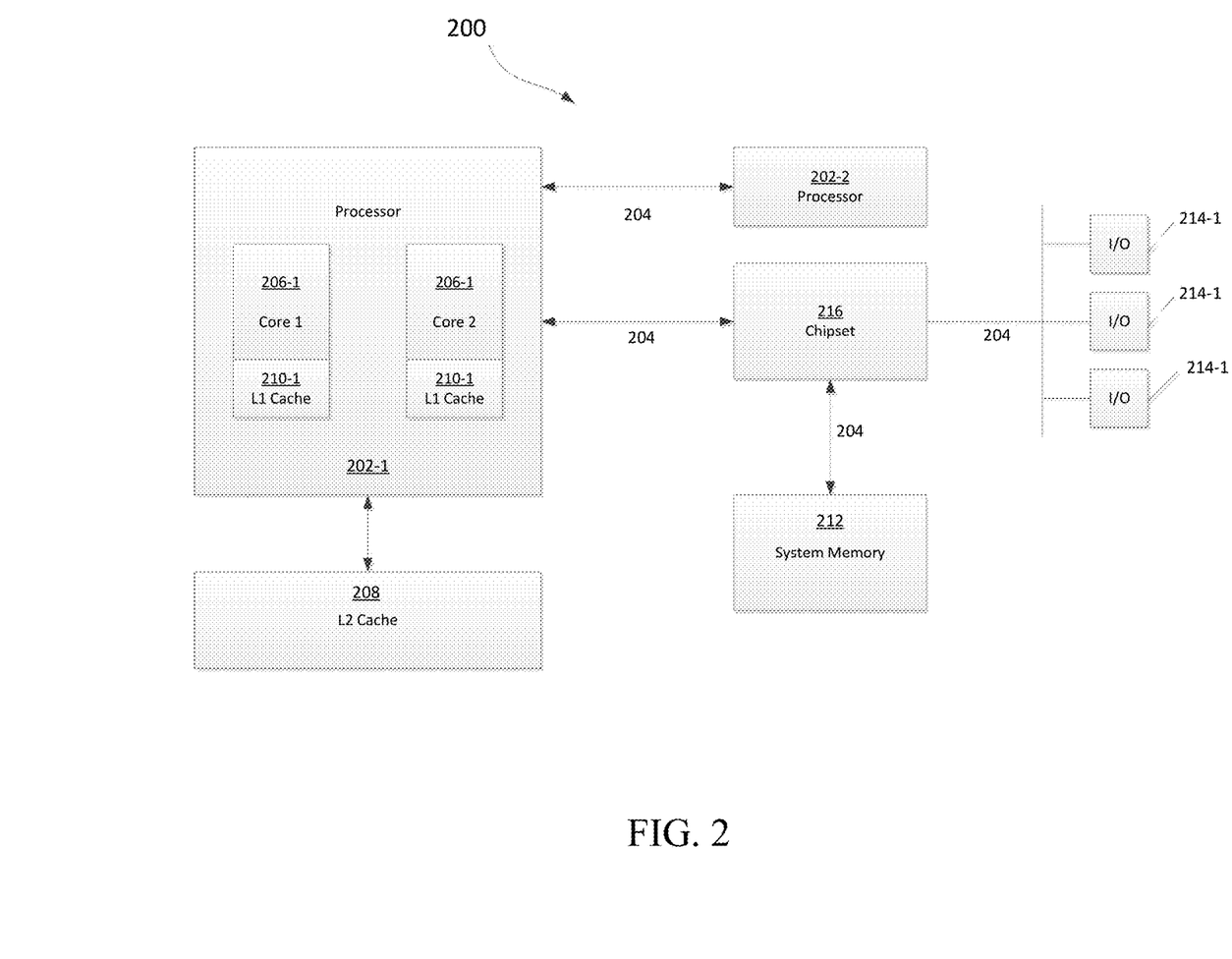
FIG. 2 illustrates an example computer device that may be part of or in communication with the system of FIG. 1.

Cores 206 may comprise a shared cache 208 and/or a private cache (e.g., caches 210-1 and 210-2, respectively). One or more caches 208/210 may locally cache data stored in a system memory, such as memory 212, for faster access by components of the processor 202. Memory 212 may be in communication with the processors 202 via a chipset 216. Cache 208 may be part of system memory 212 in certain embodiments. Memory 212 may include, but is not limited to, random access memory (RAM), read only memory (ROM), and include one or more of solid-state memory, optical or magnetic storage, and/or any other medium that can be used to store electronic information. Yet other embodiments may omit system memory 212.

System 200 may include one or more I/O devices (e.g., I/O devices 214-1 through 214-3, each generally referred to as I/O device 214). I/O data from one or more I/O devices 214 may be stored at one or more caches 208, 210 and/or system memory 212. Each of I/O devices 214 may be permanently or temporarily configured to be in operative communication with a component of system 100 using any physical or wireless communication protocol.

Returning to FIG. 1, four example I/O devices (shown as elements 116-122) are shown as being in communication with computer device 114. Those skilled in the art will appreciate that one or more of devices 116-122 may be stand-alone devices or may be associated with another device besides computer device 114. For example, one or more I/O devices may be associated with or interact with a component of BAN 102 and/or WAN 106. I/O devices 116-122 may include, but are not limited to athletic data acquisition units, such as for example, sensors. One or more I/O devices may be configured to sense, detect, and/or measure an athletic parameter from a user, such as user 124. Examples include, but are not limited to: an accelerometer, a gyroscope, a location-determining device (e.g., GPS), light (including non-visible light) sensor, temperature sensor (including ambient temperature and/or body temperature), sleep pattern sensors, heart rate monitor, image-capturing sensor, moisture sensor, force sensor, compass, angular rate sensor, and/or combinations thereof among others.

In further embodiments, I/O devices 116-122 may be used to provide an output (e.g., audible, visual, or tactile cue) and/or receive an input, such as a user input from athlete 124. Example uses for these illustrative I/O devices are provided below, however, those skilled in the art will appreciate that such discussions are merely descriptive of some of the many options within the scope of this disclosure. Further, reference to any data acquisition unit, I/O device, or sensor is to be interpreted disclosing an embodiment that may have one or more I/O device, data acquisition unit, and/or sensor disclosed herein or known in the art (either individually or in combination).

Information from one or more devices (across one or more networks) may be used to provide (or be utilized in the formation of) a variety of different parameters, metrics or physiological characteristics including but not limited to: motion parameters, such as speed, acceleration, distance, steps taken, direction, relative movement of certain body portions or objects to others, or other motion parameters which may be expressed as angular rates, rectilinear rates or combinations thereof, physiological parameters, such as calories, heart rate, sweat detection, effort, oxygen consumed, oxygen kinetics, and other metrics which may fall within one or more categories, such as: pressure, impact forces, information regarding the athlete, such as height, weight, age, demographic information and combinations thereof.

System 100 may be configured to transmit and/or receive athletic data, including the parameters, metrics, or physiological characteristics collected within system 100 or otherwise provided to system 100. As one example, WAN 106 may comprise server 111. Server 111 may have one or more components of system 200 of FIG. 2. In one embodiment, server 111 comprises at least a processor and a memory, such as processor 206 and memory 212. Server 111 may be configured to store computer-executable instructions on a non-transitory computer-readable medium. The instructions may comprise athletic data, such as raw or processed data collected within system 100. System 100 may be configured to transmit data, such as energy expenditure points, to a social networking website or host such a site. Server 111 may be utilized to permit one or more users to access and/or compare athletic data. As such, server 111 may be configured to transmit and/or receive notifications based upon athletic data or other information.

Returning to LAN 104, computer device 114 is shown in operative communication with a display device 116, an image-capturing device 118, sensor 120 and exercise device 122, which are discussed in turn below with reference to example embodiments. In one embodiment, display device 116 may provide audio-visual cues to athlete 124 to perform a specific athletic movement. The audio-visual cues may be provided in response to computer-executable instruction executed on computer device 114 or any other device, including a device of BAN 102 and/or WAN. Display device 116 may be a touchscreen device or otherwise configured to receive a user-input.

In one embodiment, data may be obtained from image-capturing device 118 and/or other sensors, such as sensor 120, which may be used to detect (and/or measure) athletic parameters, either alone or in combination with other devices, or stored information. Image-capturing device 118 and/or sensor 120 may comprise a transceiver device. In one embodiment sensor 128 may comprise an infrared (IR), electromagnetic (EM) or acoustic transceiver. For example, image-capturing device 118, and/or sensor 120 may transmit waveforms into the environment, including towards the direction of athlete 124 and receive a "reflection" or otherwise detect alterations of those released waveforms. Those skilled in the art will readily appreciate that signals corresponding to a multitude of different data spectrums may be utilized in accordance with various embodiments. In this regard, devices 118 and/or 120 may detect waveforms emitted from external sources (e.g., not system 100). For example, devices 118 and/or 120 may detect heat being emitted from user 124 and/or the surrounding environment. Thus, image-capturing device 118 and/or sensor 128 may comprise one or more thermal imaging devices. In one embodiment, image-capturing device 118 and/or sensor 128 may comprise an IR device configured to perform range phenomenology.

In one embodiment, exercise device 122 may be any device configurable to permit or facilitate the athlete 124 performing a physical movement, such as for example a treadmill, step machine, etc. There is no requirement that the device be stationary. In this regard, wireless technologies permit portable devices to be utilized, thus a bicycle or other mobile exercising device may be utilized in accordance with certain embodiments. Those skilled in the art will appreciate that equipment 122 may be or comprise an interface for receiving an electronic device containing athletic data performed remotely from computer device 114. For example, a user may use a sporting device (described below in relation to BAN 102) and upon returning home or the location of equipment 122, download athletic data into element 122 or any other device of system 100. Any I/O device disclosed herein may be configured to receive activity data.

2. Body Area Network

BAN 102 may include two or more devices configured to receive, transmit, or otherwise facilitate the collection of athletic data (including passive devices). Exemplary devices may include one or more data acquisition units, sensors, or devices known in the art or disclosed herein, including but not limited to I/O devices 116-122. Two or more components of BAN 102 may communicate directly, yet in other embodiments, communication may be conducted via a third device, which may be part of BAN 102, LAN 104, and/or WAN 106. One or more components of LAN 104 or WAN 106 may form part of BAN 102. In certain implementations, whether a device, such as portable device 112, is part of BAN 102, LAN 104, and/or WAN 106, may depend on the athlete's proximity to an access point to permit communication with mobile cellular network architecture 108 and/or WAN architecture 110. User activity and/or preference may also influence whether one or more components are utilized as part of BAN 102. Example embodiments are provided below.

User 124 may be associated with (e.g., possess, carry, wear, and/or interact with) any number of devices, such as portable device 112, shoe-mounted device 126, wrist-worn device 128 and/or a sensing location, such as sensing location 130, which may comprise a physical device or a location that is used to collect information. One or more devices 112, 126, 128, and/or 130 may not be specially designed for fitness or athletic purposes. Indeed, aspects of this disclosure relate to utilizing data from a plurality of devices, some of which are not fitness devices, to collect, detect, and/or measure athletic data. In certain embodiments, one or more devices of BAN 102 (or any other network) may comprise a fitness or sporting device that is specifically designed for a particular sporting use. As used herein, the term "sporting device" includes any physical object that may be used or implicated during a specific sport or fitness activity. Exemplary sporting devices may include, but are not limited to: golf balls, basketballs, baseballs, soccer balls, footballs, powerballs, hockey pucks, weights, bats, clubs, sticks, paddles, mats, and combinations thereof. In further embodiments, exemplary fitness devices may include objects within a sporting environment where a specific sport occurs, including the environment itself, such as a goal net, hoop, backboard, portions of a field, such as a midline, outer boundary marker, base, and combinations thereof.

In this regard, those skilled in the art will appreciate that one or more sporting devices may also be part of (or form) a structure and vice-versa, a structure may comprise one or more sporting devices or be configured to interact with a sporting device. For example, a first structure may comprise a basketball hoop and a backboard, which may be removable and replaced with a goal post. In this regard, one or more sporting devices may comprise one or more sensors, such as one or more of the sensors discussed above in relation to FIGS. 1-3, that may provide information utilized, either independently or in conjunction with other sensors, such as one or more sensors associated with one or more structures. For example, a backboard may comprise a first sensor configured to measure a force and a direction of the force by a basketball upon the backboard and the hoop may comprise a second sensor to detect a force. Similarly, a golf club may comprise a first sensor configured to detect grip attributes on the shaft and a second sensor configured to measure impact with a golf ball.

Looking to the illustrative portable device 112, it may be a multi-purpose electronic device, that for example, includes a telephone or digital music player, including an IPOD®, IPAD®, or iPhone®, brand devices available from Apple, Inc. of Cupertino, Calif. or Zune® or Microsoft® Windows devices available from Microsoft of Redmond, Wash. As known in the art, digital media players can serve as an output device, input device, and/or storage device for a computer. Device 112 may be configured as an input device for receiving raw or processed data collected from one or more devices in BAN 102, LAN 104, or WAN 106. In one or more embodiments, portable device 112 may comprise one or more components of computer device 114. For example, portable device 112 may be include a display 116, image-capturing device 118, and/or one or more data acquisition devices, such as any of the I/O devices 116-122 discussed above, with or without additional components, so as to comprise a mobile terminal.

a. Illustrative Apparel/Accessory Sensors

In certain embodiments, I/O devices may be formed within or otherwise associated with user's 124 clothing or accessories, including a watch, armband, wristband, necklace, shirt, shoe, or the like. These devices may be configured to monitor athletic movements of a user. It is to be understood that they may detect athletic movement during user's 124 interactions with computer device 114 and/or operate independently of computer device 114 (or any other device disclosed herein). For example, one or more devices in BAN 102 may be configured to function as an all-day activity monitor that measures activity regardless of the user's proximity or interactions with computer device 114. It is to be further understood that the sensory system 302 shown in FIG. 3 and the device assembly 400 shown in FIG. 4, each of which are described in the following paragraphs, are merely illustrative examples.

i. Shoe-Mounted Device

Figure 3:
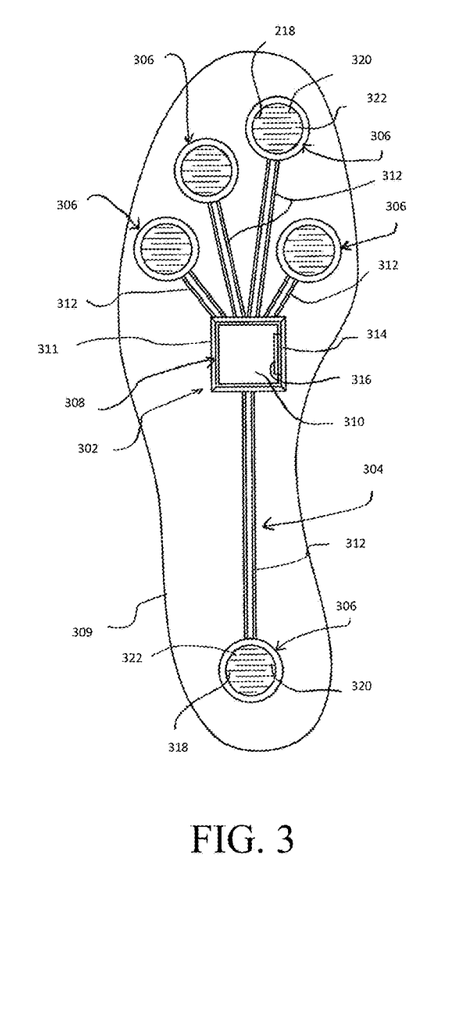
FIG. 3 shows an illustrative sensor assembly that may be worn by a user in accordance with example embodiments.

In certain embodiments, device 126 shown in FIG. 1, may comprise footwear which may include one or more sensors, including but not limited to those disclosed herein and/or known in the art. FIG. 3 illustrates one example embodiment of a sensor system 302 providing one or more sensor assemblies 304. Assembly 304 may comprise one or more sensors, such as for example, an accelerometer, gyroscope, location-determining components, force sensors and/or or any other sensor disclosed herein or known in the art. In the illustrated embodiment, assembly 304 incorporates a plurality of sensors, which may include force-sensitive resistor (FSR) sensors 306; however, other sensor(s) may be utilized. Port 308 may be positioned within a sole structure 309 of a shoe, and is generally configured for communication with one or more electronic devices. Port 308 may optionally be provided to be in communication with an electronic module 310, and the sole structure 309 may optionally include a housing 311 or other structure to receive the module 310. The sensor system 302 may also include a plurality of leads 312 connecting the FSR sensors 306 to the port 308, to enable communication with the module 310 and/or another electronic device through the port 308. Module 310 may be contained within a well or cavity in a sole structure of a shoe, and the housing 311 may be positioned within the well or cavity. In one embodiment, at least one gyroscope and at least one accelerometer are provided within a single housing, such as module 310 and/or housing 311. In at least a further embodiment, one or more sensors are provided that, when operational, are configured to provide directional information and angular rate data. The port 308 and the module 310 include complementary interfaces 314, 316 for connection and communication.

In certain embodiments, at least one force-sensitive resistor 306 shown in FIG. 3 may contain first and second electrodes or electrical contacts 318, 320 and a force-sensitive resistive material 322 disposed between the electrodes 318, 320 to electrically connect the electrodes 318, 320 together. When pressure is applied to the force-sensitive material 322, the resistivity and/or conductivity of the force-sensitive material 322 changes, which changes the electrical potential between the electrodes 318, 320. The change in resistance can be detected by the sensor system 302 to detect the force applied on the sensor 316. The force-sensitive resistive material 322 may change its resistance under pressure in a variety of ways. For example, the force-sensitive material 322 may have an internal resistance that decreases when the material is compressed. Further embodiments may utilize "volume-based resistance", which may be implemented through "smart materials." As another example, the material 322 may change the resistance by changing the degree of surface-to-surface contact, such as between two pieces of the force sensitive material 322 or between the force sensitive material 322 and one or both electrodes 318, 320. In some circumstances, this type of force-sensitive resistive behavior may be described as "contact-based resistance."

ii. Wrist-Worn Device

Figure 4:
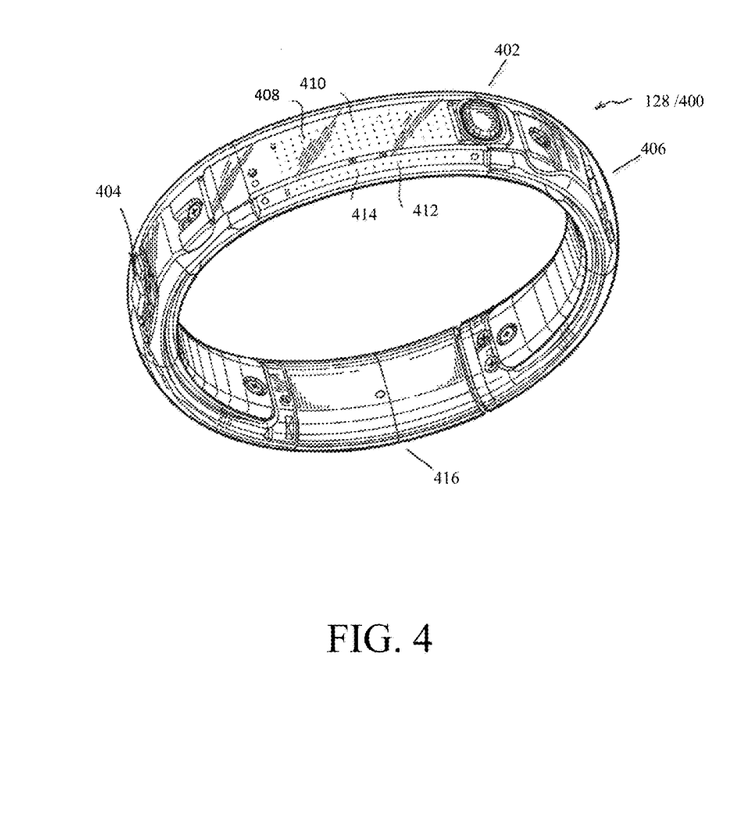
FIG. 4 shows another example sensor assembly that may be worn by a user in accordance with example embodiments.

As shown in FIG. 4, device 400 (which may resemble or comprise sensory device 128 shown in FIG. 1), may be configured to be worn by user 124, such as around a wrist, arm, ankle, neck or the like. Device 400 may include an input mechanism, such as a depressible input button 402 configured to be used during operation of the device 400. The input button 402 may be operably connected to a controller 404 and/or any other electronic components, such as one or more of the elements discussed in relation to computer device 114 shown in FIG. 1. Controller 404 may be embedded or otherwise part of housing 406. Housing 406 may be formed of one or more materials, including elastomeric components and comprise one or more displays, such as display 408. The display may be considered an illuminable portion of the device 400. The display 408 may include a series of individual lighting elements or light members such as LED lights 410. The lights may be formed in an array and operably connected to the controller 404. Device 400 may include an indicator system 412, which may also be considered a portion or component of the overall display 408. Indicator system 412 can operate and illuminate in conjunction with the display 408 (which may have pixel member 414) or completely separate from the display 408. The indicator system 412 may also include a plurality of additional lighting elements or light members, which may also take the form of LED lights in an exemplary embodiment. In certain embodiments, indicator system may provide a visual indication of goals, such as by illuminating a portion of lighting members of indicator system 412 to represent accomplishment towards one or more goals. Device 400 may be configured to display data expressed in terms of activity points or currency earned by the user based on the activity of the user, either through display 408 and/or indicator system 412.

A fastening mechanism 416 can be disengaged wherein the device 400 can be positioned around a wrist or portion of the user 124 and the fastening mechanism 416 can be subsequently placed in an engaged position. In one embodiment, fastening mechanism 416 may comprise an interface, including but not limited to a USB port, for operative interaction with computer device 114 and/or devices, such as devices 120 and/or 112. In certain embodiments, fastening member may comprise one or more magnets. In one embodiment, fastening member may be devoid of moving parts and rely entirely on magnetic forces.

In certain embodiments, device 400 may comprise a sensor assembly (not shown in FIG. 4). The sensor assembly may comprise a plurality of different sensors, including those disclosed herein and/or known in the art. In an example embodiment, the sensor assembly may comprise or permit operative connection to any sensor disclosed herein or known in the art. Device 400 and or its sensor assembly may be configured to receive data obtained from one or more external sensors.

iii. Apparel and/or Body Location Sensing

Element 130 of FIG. 1 shows an example sensory location which may be associated with a physical apparatus, such as a sensor, data acquisition unit, or other device. Yet in other embodiments, it may be a specific location of a body portion or region that is monitored, such as via an image capturing device (e.g., image capturing device 118). In certain embodiments, element 130 may comprise a sensor, such that elements 130a and 130b may be sensors integrated into apparel, such as athletic clothing. Such sensors may be placed at any desired location of the body of user 124. Sensors 130a/b may communicate (e.g., wirelessly) with one or more devices (including other sensors) of BAN 102, LAN 104, and/or WAN 106. In certain embodiments, passive sensing surfaces may reflect waveforms, such as infrared light, emitted by image-capturing device 118 and/or sensor 120. In one embodiment, passive sensors located on user's 124 apparel may comprise generally spherical structures made of glass or other transparent or translucent surfaces which may reflect waveforms. Different classes of apparel may be utilized in which a given class of apparel has specific sensors configured to be located proximate to a specific portion of the user's 124 body when properly worn. For example, golf apparel may include one or more sensors positioned on the apparel in a first configuration and yet soccer apparel may include one or more sensors positioned on apparel in a second configuration.

Figure 5:
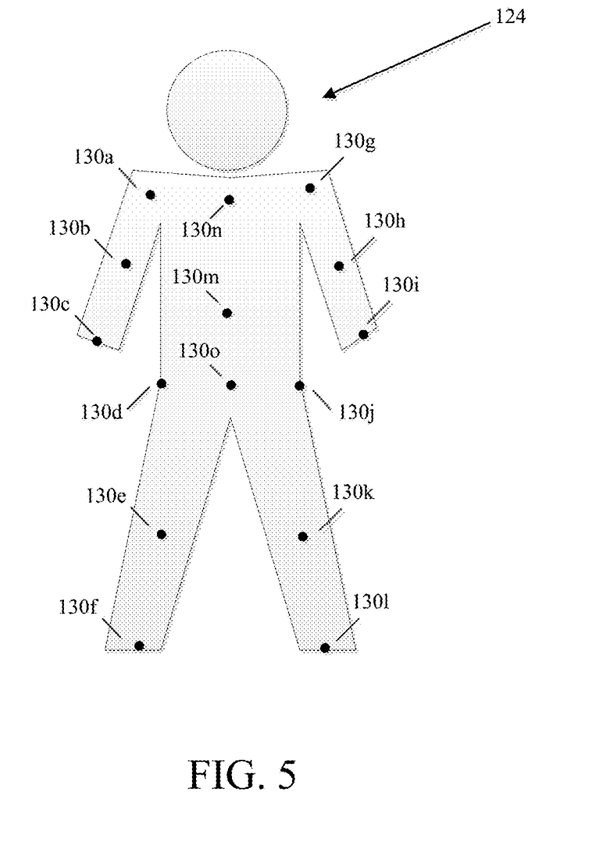
FIG. 5 shows illustrative locations for sensory input which may include physical sensors located on/in a user's clothing and/or be based upon identification of relationships between two moving body parts of the user.

FIG. 5 shows illustrative locations for sensory input (see, e.g., sensory locations 130a-130o). In this regard, sensors may be physical sensors located on/in a user's clothing, yet in other embodiments, sensor locations 130a-130o may be based upon identification of relationships between two moving body parts. For example, sensor location 130a may be determined by identifying motions of user 124 with an image-capturing device, such as image-capturing device 118. Thus, in certain embodiments, a sensor may not physically be located at a specific location (such as one or more of sensor locations 130a-130o), but is configured to sense properties of that location, such as with image-capturing device 118 or other sensor data gathered from other locations. In this regard, the overall shape or portion of a user's body may permit identification of certain body parts. Regardless of whether an image-capturing device is utilized and/or a physical sensor located on the user 124, and/or using data from other devices, (such as sensory system 302), device assembly 400 and/or any other device or sensor disclosed herein or known in the art is utilized, the sensors may sense a current location of a body part and/or track movement of the body part. In one embodiment, sensory data relating to location 130m may be utilized in a determination of the user's center of gravity (a.k.a, center of mass). For example, relationships between location 130a and location(s) 130f/130l with respect to one or more of location(s) 130m-130o may be utilized to determine if a user's center of gravity has been elevated along the vertical axis (such as during a jump) or if a user is attempting to "fake" a jump by bending and flexing their knees. In one embodiment, sensor location 130 6n may be located at about the sternum of user 124. Likewise, sensor location 130o may be located approximate to the naval of user 124. In certain embodiments, data from sensor locations 130m-130o may be utilized (alone or in combination with other data) to determine the center of gravity for user 124. In further embodiments, relationships between multiple sensor locations, such as sensors 130m-130o, may be utilized in determining orientation of the user 124 and/or rotational forces, such as twisting of user's 124 torso. Further, one or more locations, such as location(s), may be utilized as (or approximate) a center of moment location. For example, in one embodiment, one or more of location(s) 130m-130o may serve as a point for a center of moment location of user 124. In another embodiment, one or more locations may serve as a center of moment of specific body parts or regions.

II. Example Firmware Update Aspects

Some aspects of the disclosure relate to systems and processes for periodically updating firmware on one or more devices of the personal training system 100. Specifically, many of the electronic devices forming a part of the personal training system 100 (e.g., the portable electronic device 112, the wrist-worn device 128/400, the shoe-mounted device 126, one or more sensing location 130, the sensor system 302, etc.) may internally comprise firmware configured to control operating features of the respective device. As will be appreciated by those having skill in the art, a device's firmware may include a combination of hardware (such as, e.g., an integrated circuit or the like) and computer-readable instructions which reside as read-only software on the device.

The device's firmware typically contains the control program for the device. As such, during operation the device will process instructions contained within the firmware in order to perform normal operations of the device. Thus, the firmware is typically non-modifiable during normal operation of the device and is typically stored in non-volatile memory within the device.

A device manufacturer or the like may periodically release updates for the firmware for one or more reasons such as, e.g., to fix bugs discovered during operation of the device and/or to add features to the device. These updates require that the computer-readable instructions (stored within the non-volatile memory or otherwise) be replaced or otherwise reprogrammed to fix the bug, add the new feature, etc. Because these computer-readable instructions are essential for the normal operation of the device, however, these updates must typically be installed when the device is locked in an unusable mode.

Accordingly, known electronic devices typically require a user to confirm that the device is not in use, such as by the user, and then download and install the firmware update. Accordingly, during this download and install period, the device is unusable for a rather lengthy period of time. Furthermore, a user is unable to configure or otherwise control when the firmware update is downloaded and subsequently installed on the device. In this regard, a user wishing to use the device during, e.g., a workout or the like, may be disappointed to find that the device is in a firmware update mode, or must be updated before operation can commence, and thus unusable at that time.

Aspects of the present disclosure are directed to systems and processes for updating a device's firmware which, among other benefits, reduces the downtime needed to install the update and thus minimizes the chance that the install period will conflict with a user's use of the device. Specifically, according to some aspects, a download period is separated from the update period to reduce the amount of time the device is in an unusable mode. In this regard, a download period may be logically and chronologically distinct from an update period. For example, the download may be completed when a user is actively using the device (as part of the personal training system 100 or otherwise), and then subsequently installed (i.e., the computer-readable instructions of the firmware may be subsequently reprogrammed) at a time when the device is no longer in use. By separating the download from the install, the downtime of the device is significantly reduced, because the device is only rendered unusable long enough for the update to be installed, rather than rendered unusable long enough to accommodate the download plus the install, as with known firmware update methods.

Additionally, other aspects of the disclosure relate to downloading the update in discrete portions and piecing the portions together during the install period. For example, in some embodiments, the device may begin to download the update (either during a downtime of the device or, as discussed above, even during the use of the device). As the update is downloaded, external factors may interrupt, pause, or stop the download before it is complete. For example, resources on the device necessary to complete the download (e.g., RAM, ROM, battery power, processor availability, etc.) may be used by other operations thus causing the download to stop. Alternatively, the device may be powered off (manually or due to loss of battery power, etc.), and/or a network connection necessary to complete the download may be interrupted. In such instances, aspects of the disclosure may save start/stop flags such that the download may be resumed (without having to start again from the beginning) when resources again become available, when the device is powered back on, when the device is reconnected to the network, etc.

Figure 6:
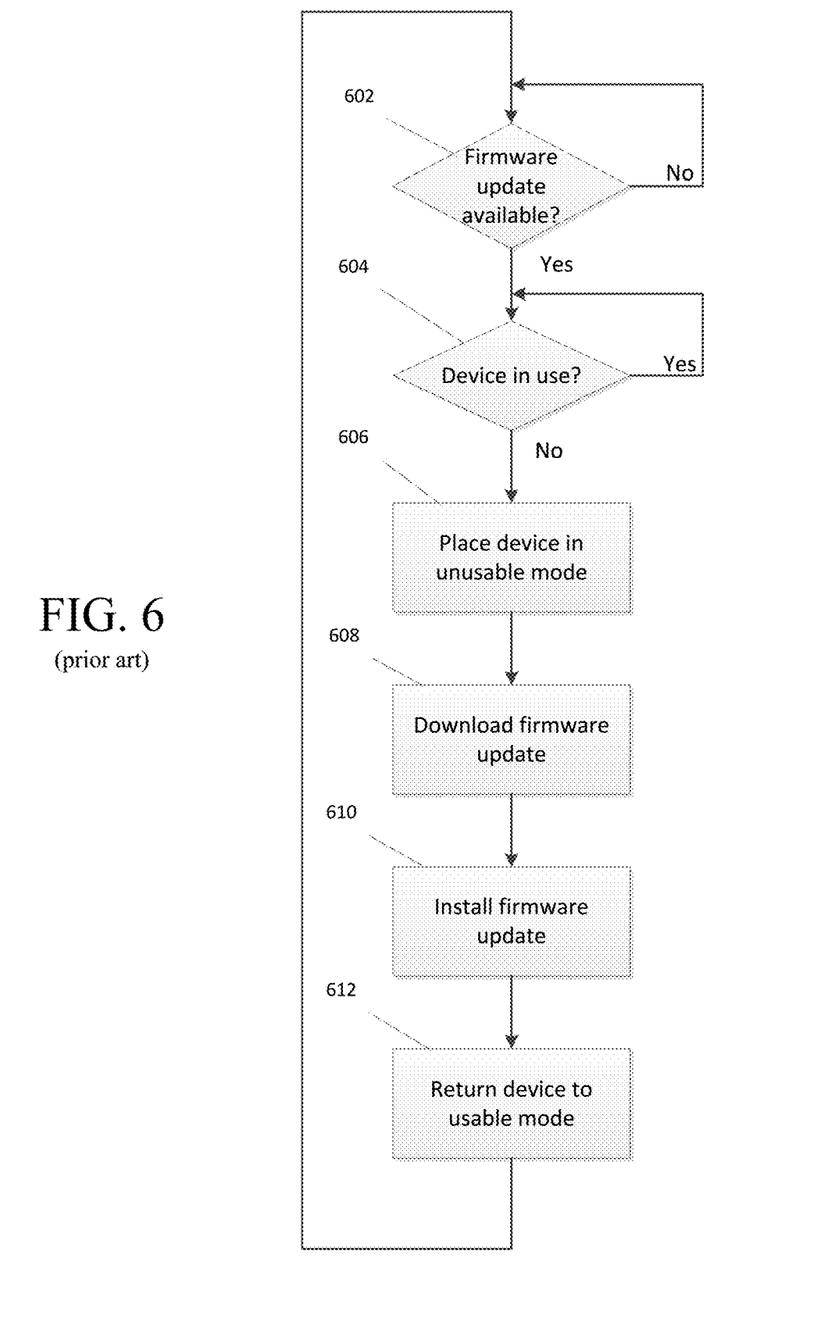
FIG. 6 shows a flowchart for a prior art method for updating firmware on an electronic device.

These and other features of the instant disclosure may be more readily understood with respect to specific examples. First, the prior art method for updating firmware on an electronic device will be described with reference to FIG. 6. Specifically, FIG. 6 is a flowchart of a method for updating the firmware of an electronic device as is well known in the art. At step 602, a processor or the like operating on the electronic device, a mobile device associated with the electronic device, on a device/server connected to electronic device via a network, etc., checks to see if a firmware update is available for the electronic device. This may typically be accomplished by communicating via a Wi-Fi network or the like with a server of the manufacturer which is periodically updated to include firmware updates for various devices that are released when, e.g., bugs are detected and/or features of the device need to be added or improved. If no such update exists (step 602, No), the method remains at step 602 until an update becomes available.

If an update is available (step 602, Yes), the method checks to see if the electronic device is in use. As discussed, because the firmware typically contains the control program for the device, it cannot be updated if the device is in use (e.g., executing other operations). According, if the device is in use (Step 604, Yes), the method remains at step 604 until the device is no longer in use (step 604, No).

Once the method determines the device is no longer in use, the method places the device in an unusable mode at step 606. As will be appreciated by those having skill in the art, the unusable mode may be a mode in which a user is unable to control the device, access data, etc., but in which the device is still powered on (such that it can communicate with a server, etc., via a network or the like). When in this unusable mode, the firmware update is downloaded at step 608 and subsequently installed at step 610. Accordingly, and as discussed above, the electronic device is unusable for a rather lengthy period of time; i.e., the device is unusable during the entire time it takes to both download the firmware update (step 608) and subsequently install the firmware update (step 610).

Once the update is complete (i.e., once the firmware update has been downloaded at step 608 and subsequently installed at step 610), the device is returned to a usable mode such that the user can once again use the normal functionality of the device, access data, etc. Then the method returns to step 602 to continually check for subsequently released updates and repeats the aforementioned steps for each subsequently released update.

In view of the method described in connection with FIG. 6, the numerous drawbacks of the prior art method are readily seen. For example, and as discussed, the period of time which the device must remain in an unusable mode is the period required to both download (step 608) and install (step 610) the firmware update. Accordingly, a user may be left without the use of her device for lengthy periods of time. Furthermore, the process download and subsequent install may begin anytime the device is not in use (step 604), and thus without warning a user may attempt to use her device only to discover that the device is in the update (and thus unusable) mode.

Figure 7:
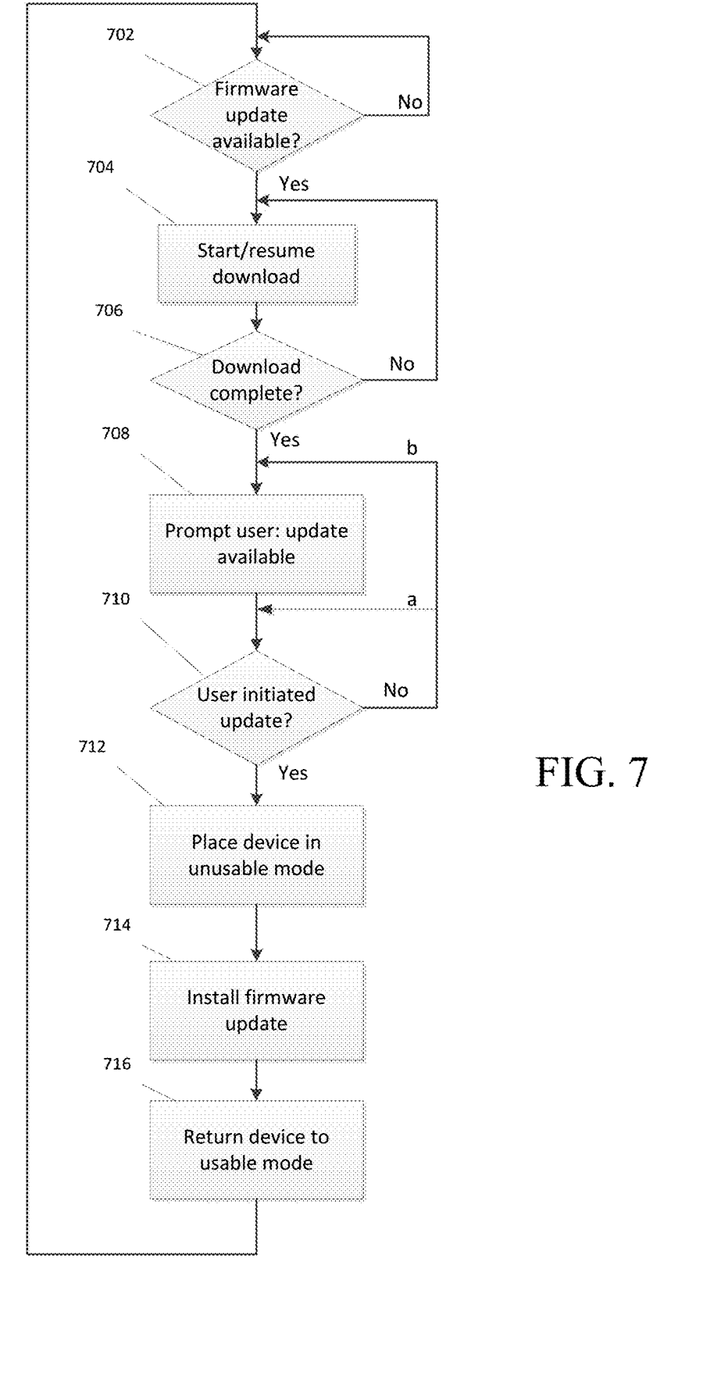
FIG. 7 shows a flowchart for a method for updating firmware on an electronic device in accordance with example embodiments.

As discussed, aspects of the disclosure address one or more of the drawbacks of the prior art method described in connection with FIG. 6, as will be more readily understood with reference to FIG. 7. Specifically, FIG. 7 shows a method for updating firmware on an electronic device according to aspects of the disclosure. The example embodiment of FIG. 7 is shown to be initiated at step 702 where it is determined if a firmware update is available for the electronic device. This may be performed by, e.g., a processor or the like operating on the electronic device, by a processor or the like operating on another electronic device (e.g., mobile phone) and associated with the electronic device (as will be described in more detail below in connection with FIG. 8), by a server 111 operatively connected to the electronic device and/or mobile phone via a network, etc. In some embodiments, the electronic device and/or a mobile device associated with the electronic device periodically communicates with a server 111 (via, e.g., cellular network architecture 108, WAN architecture 110, etc.) and compares a current version of firmware operating on the electronic device with a latest version of the firmware available from the manufacturer (and thus stored on, e.g., server 111). If at step 702 a firmware update is not available (step 702, No), step 702 may be repeated and/or rescheduled. For example, the electronic device/mobile device/server, etc. may periodically or continuously check to see if an update is available at step 702. If, however, an update is available (step 702, Yes), the step 704 may commence.

At step 704 a download of the firmware update is begun. In some embodiments, if enough resources are available on the electronic device and/or if the electronic device remains in a powered on state and connected to the network, etc., the entire firmware update may be downloaded without interruption at step 704. If so, following the download, the method may proceed to step 706, where it is determined that the entire download was completed (step 706, Yes), and certain embodiments may proceed to step 708.

In other embodiments, however, the download may be interrupted (as discussed) but, nonetheless, certain embodiments may subsequently pick up the download where it previously left off (or a prior checkpoint location). Specifically, according to aspects of the disclosure, the firmware may be downloaded in discrete portions (e.g., packets) when resources are available, when the device is connected to a network, and/or when the device is in a powered on mode, etc., as discussed, and then later pieced together (such that, e.g., the download does not need to start over each time it is interrupted, etc.). In that regard, if at step 706 it is determined that the download is not complete (step 706, No; i.e., there are additional packets yet to be downloaded, etc.), step 704 may be implemented, where downloading is resumed. The method will continue to cycle through steps 704-706 until all packets comprising the firmware update have been downloaded. In this regard, at step 704 it may be determined which packets have already been successfully downloaded (as will be discussed more fully in connection with FIG. 8), and then pick up where the previous download process left off. That is, portions of the firmware update (e.g., packets) which have not yet been successfully downloaded will subsequently be downloaded, but, notably, portions of the firmware update which have already been successfully downloaded need not be re-downloaded.

Once all portions of the firmware update have been received (step 706, Yes), a user may be notified that the firmware update is available at step 708. For example, in embodiments where the electronic device includes a display, the user may be prompted with a message that the firmware update is available. In embodiments where the electronic device is associated with another electronic device (e.g., a mobile device), the user may be prompted with a message on the display of the other mobile device that the update is available. At step 710, it is determined whether a user, once prompted, initiates the update. If the user does not initiate the update (step 710, No), certain embodiments may either waits until prompted to proceed (path "a" in FIG. 7) and/or once again notifies the user that the firmware update is available (path "b" in FIG. 7).

When the user initiates the update (step 710, Yes), the device is placed in the unusable mode at step 712. The firmware update is subsequently installed at step 714, and the device is returned to the usable mode at step 716. The method then returns to step 702, where firmware version is continually monitored until an update becomes available and thus the electronic device is once again updated following the above described steps.

In this regard, the example flowchart of FIG. 7 exhibits many benefits over the prior art method shown in FIG. 6. For example, in the prior art method the electronic device is placed in an unusable mode for a rather lengthy period of time; i.e., a period of time long enough to both download the entire firmware update (step 608) and to install the firmware update (step 610). In contrast, the method of updating the firmware of the electronic device according to aspects of the instant disclosure require the device to be in an unusable mode only when the firmware update is being installed (step 714), and notably not when the firmware update is being downloaded (steps 704-706).

Furthermore, the prior art method of updating the device's firmware place the device in the unusable mode when it is determined that the device is not in use (step 604-606). Consequently, a user who wishes to use the device after the device is placed in the unusable mode (step 606) may be frustrated to discover that her device is unusable and thus must either wait until the update is finished before using the device, or complete an activity (e.g., a workout) without the device. In contrast, updating the firmware of the electronic device according to aspects of the instant disclosure prompts the user when the update is available (step 708) and only places the device in the unusable mode after the user initiates the update (steps 710-712). In this regard, a user determines when she wants the electronic device to update and thus can coordinate the update such that it does not conflict with a workout or the like.

Still further, embodiments of the method of updating the firmware of the electronic device according to aspects of the instant disclosure downloads the firmware update in discrete portions (e.g., packets) and thus is able to start and stop the download as resources become available, during periods of intermittent connectivity, etc. Accordingly, and unlike the prior art method, if the download is interrupted or otherwise stopped, the method does not need to subsequently start over in downloading the update, but can simply pick up where it left off.

According to some aspects of the disclosure, an electronic device on which the firmware is updated may be associated with or otherwise interface with another electronic device such as a mobile device. For example, and returning to FIG. 1, an electronic device may be, e.g., the portable electronic device 112, the wrist-worn device 400/128, the shoe-mounted device 126, one or more sensing location 130, the sensor system 302, etc., which is associated with a computer device 114 such as, e.g., a mobile phone. In such embodiments, the mobile phone may have a software application installed thereon which interacts with the electronic device 112, 126, 128, 130, 302, 400 during the performance of an athletic activity and/or following the performance of an athletic activity. In such embodiments, the electronic device may not communicate directly with, e.g., a server 111 or the like when updating its firmware, but rather may update its firmware via the mobile device.

Figure 8:
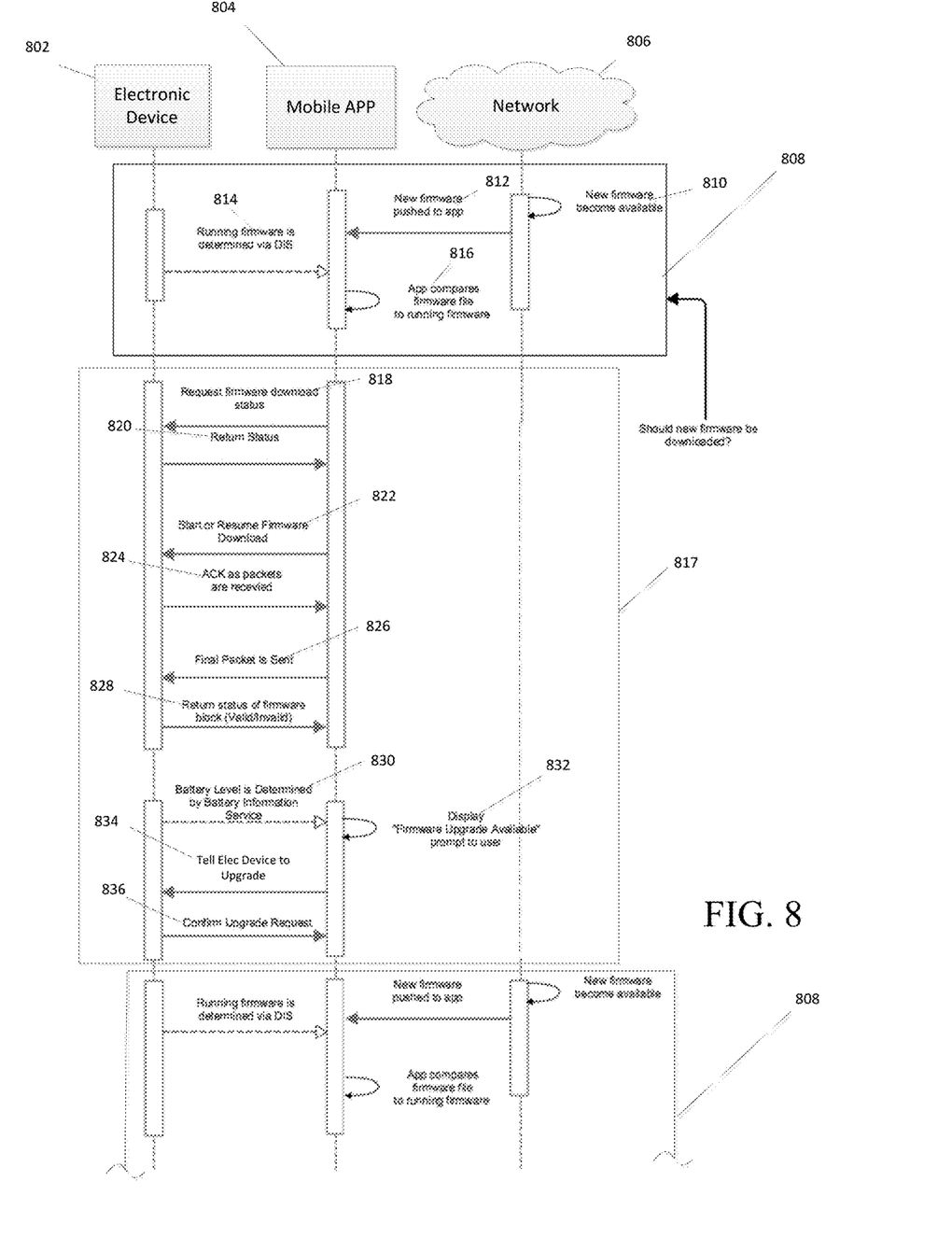
FIG. 8 is a flow diagram of a method for updating firmware on an electronic device via a mobile app in accordance with example embodiments.

This may be more readily understood with reference to FIG. 8. FIG. 8 is a flow diagram depicting a method for updating the firmware on an electronic device 802 via a software application ("app") 804 operating on a mobile device which is associated with the electronic device. First, box 808 generally depicts a process for determining if new firmware should be downloaded for the electronic device. Specifically, a manufacturer or the like may periodically release a firmware update (step 810) in order to, e.g., fix a discovered bug with previous version(s) of the firmware and/or to add features to the electronic device, etc., as discussed. The manufacturer may, in some embodiments push the firmware update (step 812) to the mobile app 804 via a network 806 (i.e., via cellular network architecture 108, WAN architecture 110, etc., as discussed). Furthermore, and as discussed, the mobile device and/or electronic device 802 need not be in an unusable state when the firmware update is pushed to the mobile app at step 812. Accordingly, this can be done even during use of the electronic device 802 and/or mobile device (e.g., during a workout or otherwise).

When the mobile app 804 receives the firmware update, it may subsequently request and/or otherwise receive an indication of the current firmware operating on the electronic device 802 (step 814) and then compare the firmware update to the firmware operating on the electronic device 802 (step 816). If, at step 816, it is determined that the firmware on the electronic device 802 needs to be updated, then the process proceeds to box 817 which generally depicts the process for updating the firmware on the electronic device 802.

During the update phase depicted in box 817, the mobile app 804 first sends a request to the electronic device for the current download status of the firmware update at step 818. That is, and as discussed more fully in connection with FIG. 7, the electronic device 802 may download or otherwise receive the update from the mobile app 804 in discrete portions (e.g., packets) and thus the entire firmware update need not be transferred to the electronic device 802 at one time. In that regard, at step 818 the mobile app 804 requests the current status of the download, and at step 820 the electronic device 802 returns the current status of the download. For example, the electronic device 802 may return an indication that the download has not yet started or, alternatively, that the download has started and an indication of what location the download should be resumed from.

At step 822, the firmware update download is started or resumed accordingly. For example, if the download has not yet started, the mobile app 804 may send the first packet of the firmware update to the electronic device 802. If the firmware update download has previously been started, the mobile app 804 may send a packet to the electronic device starting from a location where the download previously left off. As each packet is successfully received/downloaded, the electronic device 802 may send an acknowledgement to the mobile app 804 at step 824. Accordingly, when the acknowledgement is received, the mobile app 804 may send the next packet at step 822. In this regard, the method will cycle through steps 822-824 for each subsequent packet of the firmware update.

At step 826 the final packet of the firmware update is sent to the electronic device 802 which in turn returns a status to the mobile app 804 at step 828 indicating that all packets have been received. As should be appreciated given the benefit of this disclosure, particularly in view of the discussion above with respect to FIG. 7, this incremental download (e.g., downloading discrete packets at steps 818-828) may be done when the device is in a usable mode.

Once the firmware update has been completely transferred to the electronic device 802, in some embodiments the electronic device 802 may determine its battery level and send a corresponding indication to the mobile app 804 at step 830. Specifically, in some embodiments the electronic device 802 may determine if it has a high enough battery level such that it will remain powered on during the time need to fully install the firmware update. If the electronic device 802 does have a high enough battery level to install the update, the mobile app 804 may prompt the user at step 832 that the firmware update is available. In response, at step 832 the user may subsequently confirm that electronic device 802 should be updated (by, e.g., entering input directly into the mobile app 804), which in turn sends an instruction to the electronic device at step 834 indicating that the firmware update should be installed. The electronic device 802 may subsequently be places in an unusable mode while the update is installed, returning a confirmation when the install is complete at step 836. The method may then proceed once again to box 808, where the process is repeated once a subsequent firmware update is released.

Figure 9:
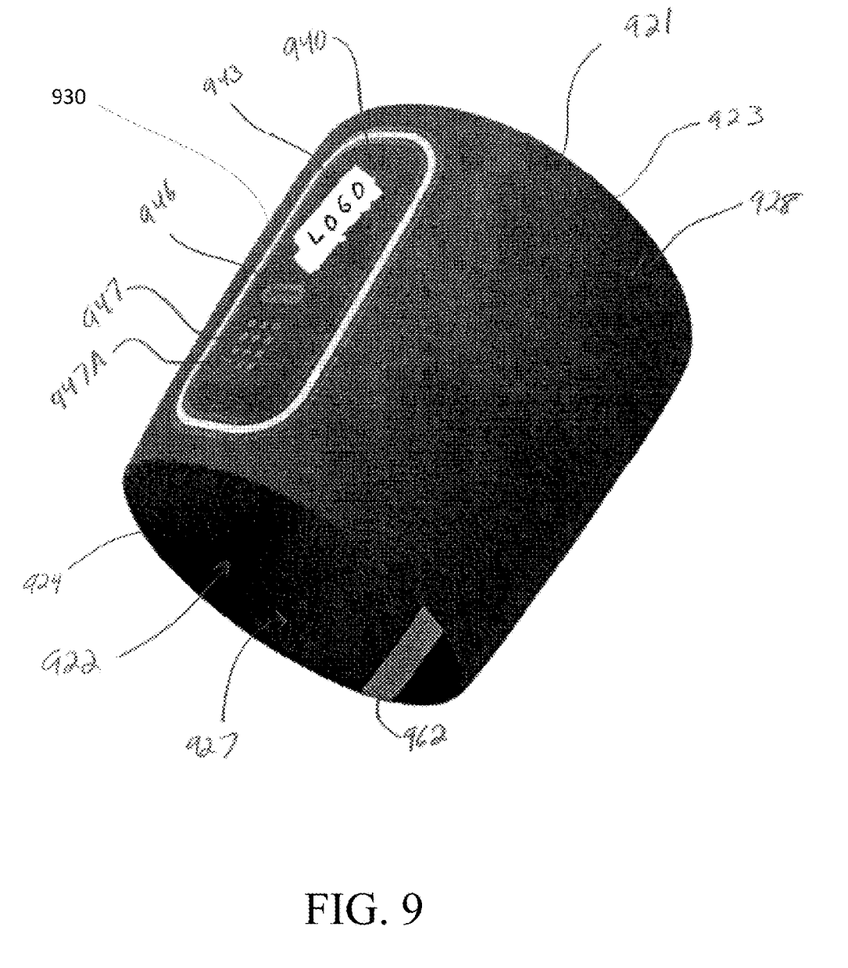
FIG. 9 depicts an armband configured to hold an athletic activity sensor as one suitable example of an electronic device that has its firmware updated according to the process of FIG. 8.

As discussed, the process depicted in FIG. 8 may be utilized for any type of electronic device (e.g., portable electronic device 112, shoe-mounted device 126, wrist-worn device 128/400, sensing location 130, sensor system 302, among others) associated with a mobile app. By way of an example, FIG. 9 depicts an athletic band 920 with a removable module 930, the module 930 being one suitable example an electronic device 802 including firmware that may be updated according to the process depicted in FIG. 8.

According to some aspects, the band 920 is configured to be secured against the user's skin or clothing. In one embodiment, the band is configured to be an armband, however, may be configured as a wristband, waistband, or other configuration. In one embodiment, the band 920 is configured to be worn between the user's elbow and wrist. In another embodiment, the band is configured to be worn in a location between the elbow and the shoulder.

In the depicted embodiment, the band 920 includes a tubular body 921 defining a central passage 922, such that the user's arm is received through the passage 922 and the tubular body 921 wraps around the arm. The tubular body 921 is somewhat frusto-conical in shape in the embodiment shown, with a wider end 923 configured to be positioned closer to the elbow, and an opposite narrower end 924 configured to be positioned closer to the wrist, where the arm is typically smaller. The frusto-conical shape of the tubular body 921 may assist in resisting slipping of the band 920 when worn on the user's forearm during activity. In other embodiments, a similarly structured band 920 may be configured to be worn elsewhere on the body. For example, the band 920 may be configured to be worn elsewhere on the arm, such as on the upper arm, the wrist, the hand, etc. As another example, the band 920 may be configured to wrap around a different body part of the user, such as various locations on the leg, neck, torso, head, etc. It is understood that the dimensions and contours of the band 920 may be adjusted for wrapping around different body parts.

According to some aspects, the band 920 includes a pocket 940 attached to, or formed integrally with, the band 920, configured to retain an electronic module 930. In this regard, the band may form a seal or other surface around a portion of the user's skin in a manner that distributes forces such that at least a portion of the band 920 is held against the user's skin with a less force per unit area compared to any surface of an electronic module 930 held in the pocket 940 is pressed against the skin when the user is wearing the band 920. The module 930 held against the user's skin may act as sensor during physical activity of the user and may measure one or more attributes (e.g., physiological, biomedical, athletic, with the understanding that these may be overlapping examples) of a user during physical movements. The pocket 940 may include an outer wall 943 that forms part of the outer surface 928 of the band 920 and an inner wall (not shown) that forms part of the inner surface 927 of the band 920, with the cavity defined between the walls to receive the module 930.

The outer wall 943 of the pocket is configured to cover the module 930, and may be configured to permit reading and/or manipulation of the module through the outer wall 943. For example, the outer wall 943 may include one or more windows 946 to permit viewing of a display of the module 930. Such a window 946 may be an opening in the outer wall 943 or a transparent or translucent portion that allows viewing of a light or lighted display therethrough. For example, the outer wall 943 may have a window 946 to permit viewing of a single light, and may additionally or alternately have one or more windows 946 configured to permit viewing of a plurality of LEDs on the module 930 (i.e., a readable display). It is understood that the pocket 940 may have one or more windows 946 configured to be complementary with the structure of the module 930.

As another example, the outer wall 943 may have one or more button portions 947 that are configured to allow manipulation of one or more buttons of the module 930 through the outer wall 943. It is understood that "buttons" may include mechanical/electrical buttons, a touch-screen interface, or other manually operable components. The button portion 947 may simply be a flexible portion of the outer wall 943 that permits the user to press the button portion 947 to activate the button of the module 930. In another embodiment, the button portion 947 may have a button mechanism (or mechanisms) that actuates the button(s) of the module 930. In a further embodiment, the button portion 947 may double as a window 946, such as if the module 930 has a button with a light on it or if the module 930 has a lighted touch-screen display. The outer wall 943 may further have indicia 947A, such as indications of the location(s) of the button(s) on the module 930, logos, instructions, etc.

As discussed above with reference to FIG. 8, the module 930 (as one example of an electronic device 802) may be operatively associated with a fitness or other software application (as one example of a mobile app 804) operating on a mobile phone. In such embodiments, firmware operating on the module 930 may be periodically updated via the fitness or other software application such as, e.g., through the process depicted in FIG. 8. For example, the firmware update may be transferred to module 130 from the mobile app even when the module 130 is being used and/or in a useable mode (at once or, alternatively, in several discrete packets, as discussed), and then subsequently installed when the device is not in use after user input is received at the mobile app indicating that the firmware should be updated.

We claim:

1. A method for downloading and installing a firmware update on an electronic device, the method comprising:
   determining if a firmware update is available for an electronic device;
   in response to determining that a firmware update is available for the electronic device, downloading the firmware update while the electronic device is in a usable mode;
   upon completion of downloading the firmware update while the electronic device is in the usable mode, notifying a user that the firmware update is available for the electronic device;
   receiving an input from the user to initiate the firmware update responsive to a prompt;
   in response to receiving the input from the user to initiate the firmware update responsive to the prompt, placing the electronic device in an unusable mode;
   installing the firmware update while the electronic device is in the unusable mode; and
   upon completion of installing the firmware update while the electronic device is in the unusable mode, returning the electronic device to the usable mode.

2. The method according to claim 1, wherein downloading the firmware update comprises downloading discrete packets such that the downloading may be paused and resumed.

3. The method according to claim 2, wherein the discrete packets of the firmware update are downloaded when resources are available, when the electronic device is connected to a network, and/or when the electronic device is in a powered on mode.

4. The method according to claim 1, wherein the firmware update is downloaded directly from a server.

5. The method according to claim 1, wherein the firmware update is downloaded from another electronic device.

6. The method according to claim 5, wherein downloading and installing the firmware update is controlled by the other electronic device.

7. The method according to claim 6, wherein the electronic device sends an indication of a battery level of the electronic device to the other electronic device.

8. The method according to claim 7, further comprising:
   determining if the battery level of the electronic device meets a threshold level to install the firmware update; and
   upon determining that the battery level of the electronic device meets the threshold level, transmitting a prompt to the other electronic device indicating that the firmware update is available.

9. The method according to claim 5, wherein the other electronic device is a mobile device.

10. The method according to claim 1, wherein the electronic device is an athletic activity data device.

11. The method according to claim 1, wherein notifying the user that the firmware update is available for the electronic device includes:
    upon completion of downloading the firmware update while the electronic device is in the usable mode, determining whether the electronic device is in use,
    wherein the electronic device is placed in an unusable mode based upon determining that the electronic device is not in use.

12. The method according to claim 1, wherein notifying the user that the firmware update is available for the electronic device includes:
    determining whether the firmware update has been authorized by the user,
    wherein the electronic device is placed in the unusable mode upon determining that the firmware update has been authorized by the user.

13. An athletic activity data device comprising:
    a processor; and
    a non-transitory computer readable medium on which are stored computer-executable instructions which, when executed, cause the processor to:
    determine if a firmware update is available for the athletic activity data device;
    in response to determining that a firmware update is available for the athletic activity data device, download the firmware update while the athletic activity data device is in a usable mode;
    upon completion of downloading the firmware update while the athletic activity data device is in the usable mode, notify a user that the firmware update is available for the athletic activity data device;
    receive an input from the user to initiate the firmware update responsive to a prompt;
    in response to receiving the input from the user to initiate the firmware update responsive to the prompt, place the athletic activity data device in an unusable mode;
    install the firmware update while the athletic activity data device is in the unusable mode; and
    upon completion of installing the firmware update while the athletic activity data device is in the unusable mode, return the athletic activity data device to the usable mode.

14. The athletic activity data device according to claim 13, further comprising a sensor, and wherein the non-transitory computer readable medium further stores computer-executable instructions which, when executed, cause the processor to obtain athletic activity data from the sensor.

15. The athletic activity data device according to claim 13, wherein downloading the firmware update comprises downloading discrete packets such that the downloading may be paused and resumed.

16. The athletic activity data device according to claim 13, wherein the firmware update is downloaded from another electronic device.

17. The athletic activity data device according to claim 13, wherein notifying the user that the firmware update is available for the athletic activity data device includes:
    upon completion of downloading the firmware update while the athletic activity data device is in the usable mode, determining whether the athletic activity data device is in use, wherein the athletic activity data device is placed in an unusable mode based upon determining that the athletic activity data device is not in use.

18. The athletic activity data device according to claim 13, wherein notifying the user that the firmware update is available for the athletic activity data device includes:
   determining whether the firmware update has been authorized by the user,
   wherein the athletic activity data device is placed in the unusable mode upon determining that the firmware update has been authorized by the user.

* * * * *